(12) United States Patent
Brune et al.

(10) Patent No.: US 8,417,846 B2
(45) Date of Patent: Apr. 9, 2013

(54) DEVICE FOR REAL-TIME STREAMING OF TWO OR MORE STREAMS IN PARALLEL TO A SOLID STATE MEMORY DEVICE ARRAY

(75) Inventors: Thomas Brune, Hannover (DE); Michael Drexler, Gehrden (DE); Oliver Kamphenkel, Lehrte (DE)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 12/815,636

(22) Filed: Jun. 15, 2010

(65) Prior Publication Data

US 2010/0318689 A1    Dec. 16, 2010

(30) Foreign Application Priority Data

Jun. 15, 2009    (EP) .................................. 09305546

(51) Int. Cl.
*G06F 13/28*    (2006.01)
(52) U.S. Cl.
USPC .................. 710/27; 710/22; 710/23; 710/24; 710/25; 710/26; 710/28
(58) Field of Classification Search ............... None
See application file for complete search history.

(56) References Cited

U.S. PATENT DOCUMENTS

| | | | | |
|---|---|---|---|---|
| 5,586,264 A * | 12/1996 | Belknap et al. | ............... | 725/115 |
| 5,592,612 A * | 1/1997 | Birk | ............................. | 714/6.24 |
| 5,712,976 A * | 1/1998 | Falcon et al. | ................. | 725/115 |
| 5,938,734 A * | 8/1999 | Yao et al. | ....................... | 709/232 |
| 6,104,861 A * | 8/2000 | Tsukagoshi | ................... | 386/241 |
| 6,134,596 A * | 10/2000 | Bolosky et al. | ............... | 709/233 |
| 6,167,496 A * | 12/2000 | Fechner | ........................ | 711/168 |
| 6,205,525 B1 * | 3/2001 | Korst | .............................. | 711/154 |
| 6,330,645 B1 * | 12/2001 | Harriman | ....................... | 711/151 |
| 6,366,970 B1 * | 4/2002 | Wolff et al. | ..................... | 710/52 |
| 6,477,541 B1 * | 11/2002 | Korst et al. | ........................... | 1/1 |
| 6,977,871 B2 * | 12/2005 | Tsumagari et al. | ........ | 369/30.04 |

(Continued)

FOREIGN PATENT DOCUMENTS

| | | |
|---|---|---|
| EP | 0735508 A1 | 10/1996 |
| EP | 0737929 A2 | 10/1996 |
| EP | 0762300 A2 | 3/1997 |
| WO | 03/065189 A1 | 8/2003 |

OTHER PUBLICATIONS

European Search Report dated Nov. 20, 2009 for EP 09 30 5546.

*Primary Examiner* — Henry Tsai
*Assistant Examiner* — Jing-Yih Shyu
(74) *Attorney, Agent, or Firm* — Tutunjian & Bitetto, P.C.

(57) ABSTRACT

Device for real-time streaming to an array of solid state memory device sets, said device comprising receiving means for receiving data from data streams of individual data rate in parallel, an input cache for buffering received data, a bus system for transferring data from the input buffer to the solid state memory device sets, and a controller adapted for using a page-receiving-time $t\_r$, a page-writing-time $wrt\_tm$, the data amount p and the individual data rates for dynamically controlling the bus system such that data received from the first data stream is transferred to solid state memory device sets comprised in a first subset of said array of solid state memory device sets, only, and data received from the at least a second data stream is transferred to solid state memory device sets comprised in a different second subset of said array of solid state memory device sets, only.

3 Claims, 5 Drawing Sheets

U.S. PATENT DOCUMENTS

| | | | | |
|---|---|---|---|---|
| 7,046,805 B2* | 5/2006 | Fitzhardinge et al. | | 380/212 |
| 7,093,277 B2* | 8/2006 | Perlman | | 725/142 |
| 7,366,826 B2* | 4/2008 | Gorobets et al. | | 711/103 |
| 7,386,129 B2* | 6/2008 | Perlman | | 380/212 |
| 7,386,655 B2* | 6/2008 | Gorobets et al. | | 711/103 |
| 7,388,932 B1* | 6/2008 | Zhang et al. | | 375/316 |
| 7,412,560 B2* | 8/2008 | Smith et al. | | 711/103 |
| 7,463,598 B1* | 12/2008 | Ng et al. | | 370/260 |
| 7,463,737 B2* | 12/2008 | Gillon et al. | | 380/223 |
| 7,490,196 B2* | 2/2009 | Unno | | 711/111 |
| 7,542,656 B2* | 6/2009 | Cho et al. | | 386/248 |
| 7,647,459 B2* | 1/2010 | Zhang et al. | | 711/161 |
| 7,702,015 B2* | 4/2010 | Richter et al. | | 375/240.11 |
| 7,760,987 B2* | 7/2010 | Cho et al. | | 386/240 |
| 7,809,994 B2* | 10/2010 | Gorobets | | 714/52 |
| 7,869,700 B2* | 1/2011 | MacLean et al. | | 386/354 |
| 7,975,061 B1* | 7/2011 | Gokhale et al. | | 709/231 |
| 7,995,652 B2* | 8/2011 | Washington | | 375/240.11 |
| 8,156,089 B2* | 4/2012 | Pantos et al. | | 707/693 |
| 2003/0131191 A1* | 7/2003 | Zhang et al. | | 711/113 |
| 2003/0233396 A1* | 12/2003 | Wolfe, Jr. | | 709/200 |
| 2009/0279613 A1* | 11/2009 | Suzumura | | 375/240.25 |
| 2010/0023674 A1* | 1/2010 | Aviles | | 711/103 |

* cited by examiner

DEVICE FOR REAL-TIME STREAMING OF TWO OR MORE STREAMS IN PARALLEL TO A SOLID STATE MEMORY DEVICE ARRAY

TECHNICAL FIELD

The invention is made in the technical field of real-time streaming of two or more data streams in parallel to a solid state memory device array.

BACKGROUND OF THE INVENTION

Digital video cameras capture frames at a frame rate and with a frame resolution by help of an image capturing device being for instance a complementary metal-oxide semiconductor (CMOS) or a charge coupled device (CCD). The frame rate and the frame resolution result in a capture data rate.

For professional applications, frame rate and resolution need to be high. Additionally, compression is not well accepted in live production capture or digital cinematography workflows. So, the capture data rate of professional video equipment and, thus, the data rate of the data stream produced by such professional video equipment are high as well.

Captured frames need to be stored. For storage in real-time, the storage data rate has to meet the capture data rate. But, commonly used slow memorizing devices like solid state memories (e.g. flash memories, phase change random access memories or magneto-resistive random access memories) do have storage data rates which are significantly lower than said high capture data rate resulting in professional applications.

Therefore, a solid state memory device set comprising several solid state memory devices is used. The solid state memory devices in the memory device set are provided with data in parallel. So, the storage data rate of the memory device set equals the cumulated storage data rates of the solid state memory devices comprised in said memory device set.

For synchronizing purposes the solid state memory device set is hosted in a device for real-time streaming which comprises receiving means for receiving a data stream, e.g. from the video camera's image capturing device. For synchronization, received data is buffered in a cache buffer, for instance a dynamic random access memory (DRAM), prior to being transferred to one of the solid state memory device set by a bus.

Solid state memory devices commonly comprise one or more solid state memory dies, also called memory units, adapted for writing data in fixed data amount units, so-called pages. To do so, each memory die may be equipped with or comprise a page buffer (e.g. SRAM) into which a data amount corresponding one page is copied from the cache buffer in a burst which takes a page-receiving-time $t\_r$. After copying one page, the solid state memory die becomes inaccessible for a page-writing-time $wrt\_tm$ which is the time it takes to write the received page from page buffer to the solid state memory unit.

Video productions more and more produces several data streams in parallel, e.g. an audio stream and a video stream or, for 3D video, a main video stream and one or 30 more satellite video streams or a main video stream and a depth data stream, to name a few, each coming along with an individual data rate.

If the individual data rates are known in advance and fixed, optimized hardware layout as well as an associated bus control method is easy to achieve.

But, if data rates or their variations are not known in advance or if even the number of streams to be handled is unknown, specification of optimized hardware layout for the device for real-time streaming as well as corresponding bus control method is an unsolved problem not even published in the art, yet.

SUMMARY OF THE INVENTION

The invention proposes a device for real-time streaming to an array of solid state memory device sets, said device comprising receiving means for receiving data from data streams of individual data rate in parallel, an input cache for buffering received data, a bus system for transferring data from the input buffer to the solid state memory device sets, and a controller adapted for using a page-receiving-time $t\_r$, a page-writing-time $wrt\_tm$, the data amount p and the individual data rates for dynamically controlling the bus system such that data received from the first data stream is transferred to solid state memory device sets comprised in a first subset of said array of solid state memory device sets, only, and data received from the at least a second data stream is transferred to solid state memory device sets comprised in a different second subset of said array of solid state memory device sets, only.

More precisely, the invention proposes a device for real-time streaming to an array of solid state memory device sets comprising the features of claim 1.

When in play-out or read mode, there is a benefit from sorted data streams per subset. Since there are almost no read-out penalty cycles with the solid state memory device sets, according devices can be reordered by mapping appropriate chip select lines, so that the data can be provided with full bus speed for single data streams.

The features of a further advantageous embodiment of the real-time streaming device are specified in the dependent claim.

The invention further proposes a bus control method suited to be used in a real-time streaming device for streaming two or more data streams to an array of solid state memory device sets, said method comprises the features of claim 3.

BRIEF DESCRIPTION OF THE DRAWINGS

Exemplary embodiments of the invention are illustrated in the drawings and are explained in more detail in the following description. The exemplary embodiments are explained only for elucidating the invention, but not limiting the invention's scope and spirit defined in the claims.

In the figures.

EXEMPLARY EMBODIMENTS OF THE INVENTION

Figure 4:
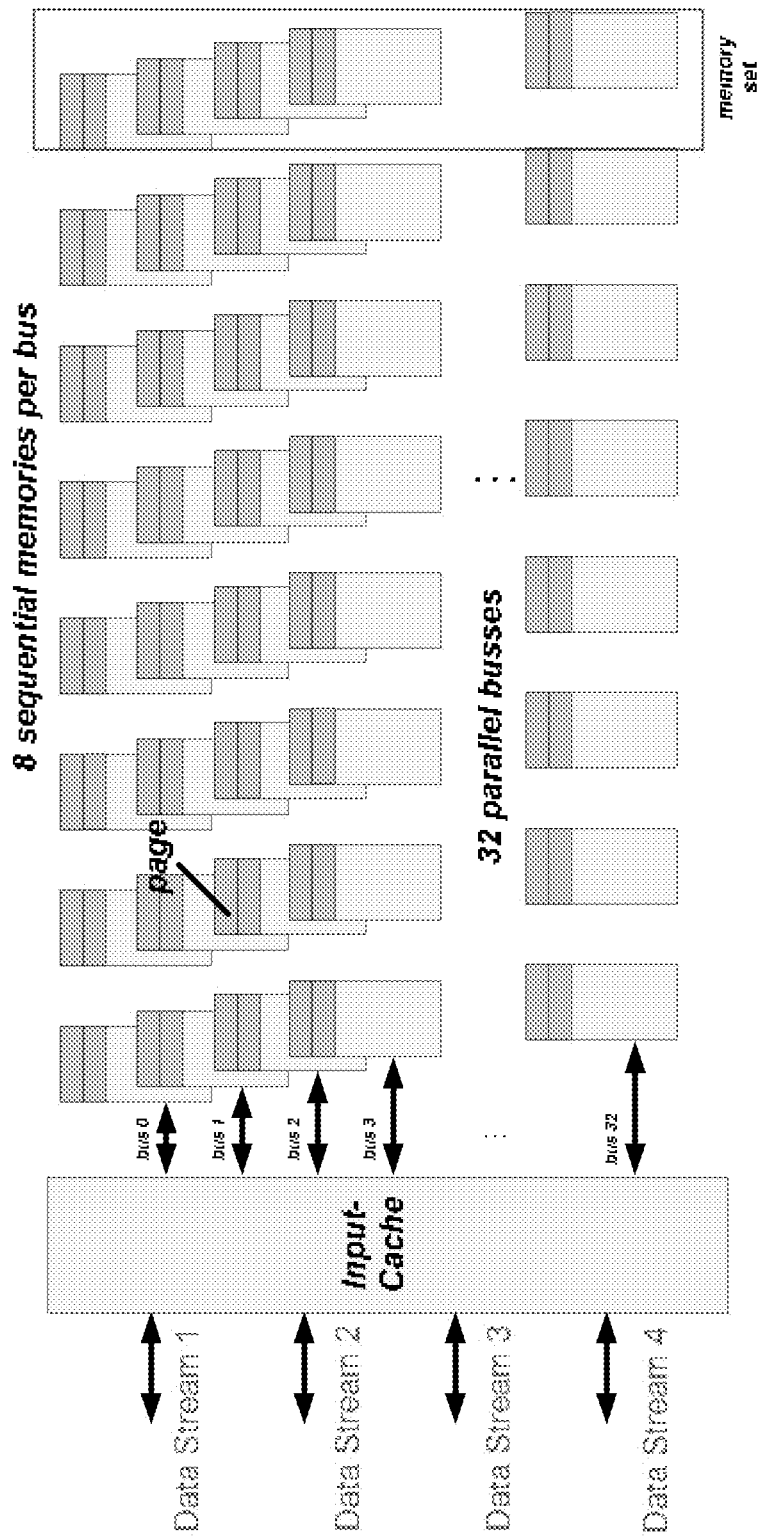
FIG. 4 depicts another exemplary Flash-Die matrix of a multi-stream recording architecture.

FIG. 4 shows an exemplary Flash recording device comprising a matrix or array of Flash memories respectively a matrix of memory device sets. The notion of memory device and memory will be used interchangeably.

Figure 5:
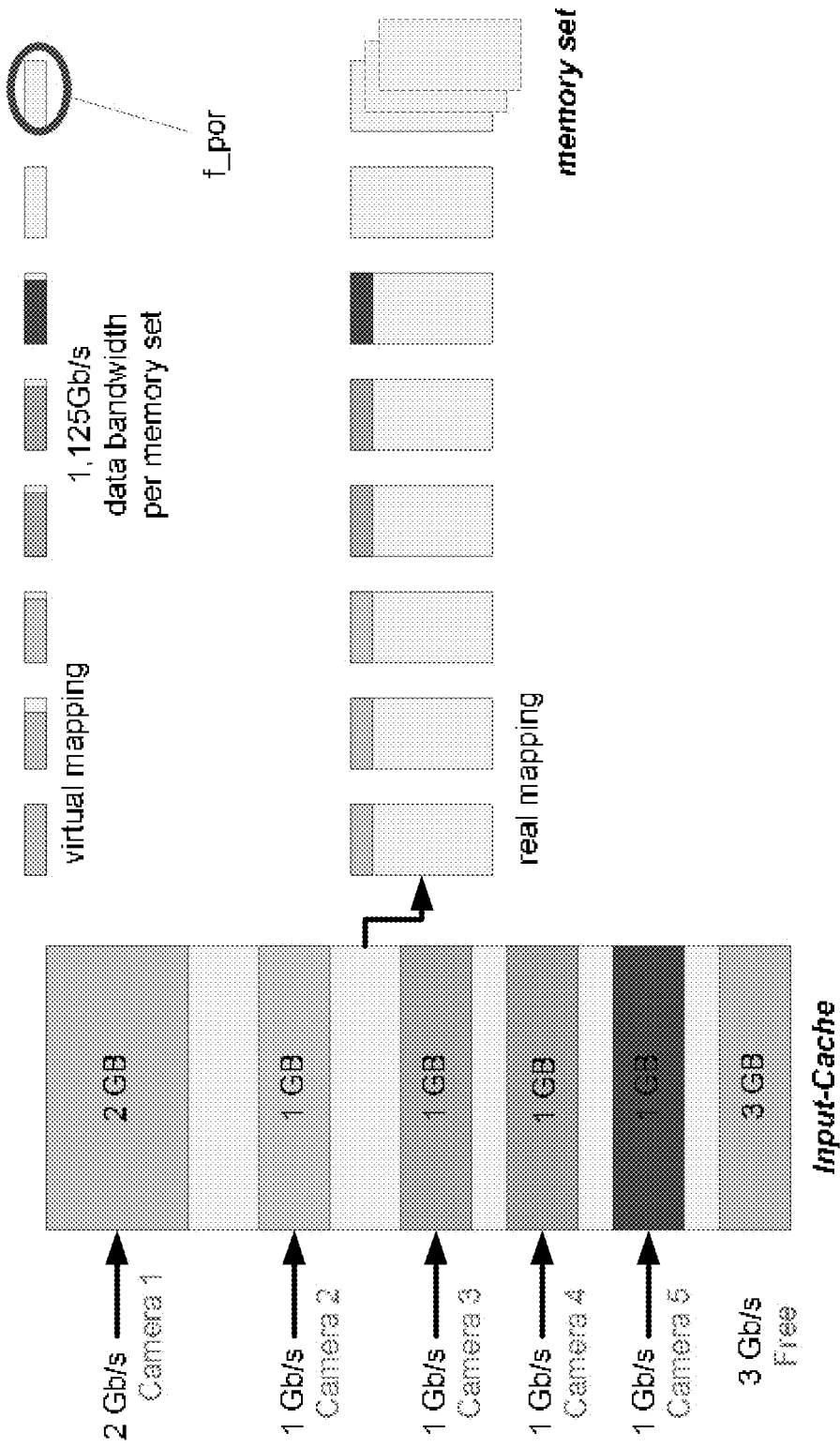
FIG. 5 depicts yet another exemplary memory set array of a multi-stream recording architecture.

This multi-stream recording architecture may use other solid state memories which rely on page-based writing instead of NAND flash memory. In the example depicted in FIG. 4, there are 32 parallel Flash busses with eight sequentially connected Flash memories, each. Whereby, one physical Flash device can contain more than one Flash memories, since today more than one Flash-Dies are combined within one Flash device package. As depicted in FIG. 4 one can define, that a memory device set gathers the same ordered Flash memory on each bus. Assuming in FIG. 5 one memory device set provides an exemplary write data bandwidth of 1.125 Gbit/s, each (see 'virtual mapping') Eight memory device sets are supported the busses to completely cover Flash technology write-back penalty cycles. This leads to a total data bandwidth of 8×1.125 Gbit/s=9 Gbit/s at all.

The example shows an input data stream of 2 Gbit/s data rate and four input streams of 1 Gbit/s data rate each. Imagined is a sampling after eight seconds. Then the input cache is filled and a virtual mapping can be done according to FIG. 5. One can define two data memory device sets are allocated by the data bandwidth of camera stream 1 and one memory device set each for the camera streams 2 to 5. Two memory device sets are unused.

It is important to know that when writing to each memory device set, this memory device set needs internal write-back penalty cycles before writing again to the same memory device set. In the mentioned example the architecture is advantageously designed in the manner that when all other seven memory device sets are written, the first mentioned device set is ready for writing again, so a sustained writing over all eight memory device sets is mandatory. Also, it is to be noticed, that a Flash memory does a write-back only on a complete Flash page size of data. Because of these limitations in write-back behaviour, a small input cache has to be introduced to provide only complete pages of data to the Flash memory device sets. This input cache can be designed global as exemplarily shown in FIG. 4. Or, it can also be implemented local on each Flash memory. Because of the missfitting bandwidth of incoming data streams according the fixed page length issue of the write-back data per memory device set, headroom in terms of bandwidth have to be foreseen (FIG. 5, f_por). f_por is consumed due to memory scheduling. The size of f_por changes dependant on the number of streams and their bandwidth allocation. Worst case of f_por is measured with 10% of a memory device set data bandwidth. But when mapping the virtual model to the real memory device sets, the full range of memory device sets can be used.

While recording, different data streams are sorted advantageously to certain memory device sets on the bus. In the example, up to seven (plus one with 10% bit rate, due to f_por) independent input streams are possible to record. All can share a data bandwidth of up to 9 Gbit/s. The behaviour of bandwidth allocation is in principle fully dynamical, but memory device set usage per input stream increases every 1.125 Gbit/s bandwidth portion need. The memory device set count is limited to eight, as already mentioned.

Multiple degrees of freedom can be reached by putting more memory device sets on the busses. Here, timing will be relaxed and more independent data streams can be recorded.

When in play-out or read mode, this architectural approach can benefit from sorted data streams per memory device set. Since there are almost no read-out penalty cycles with the Flash memories, according memory device sets can be reordered by mapping appropriate memory chip select lines, so that the data can be provided with full bus speed (here 9 Gbit/s) for single data streams, alternatively several streams in parallel can be arranged as wanted.

Figure 1:
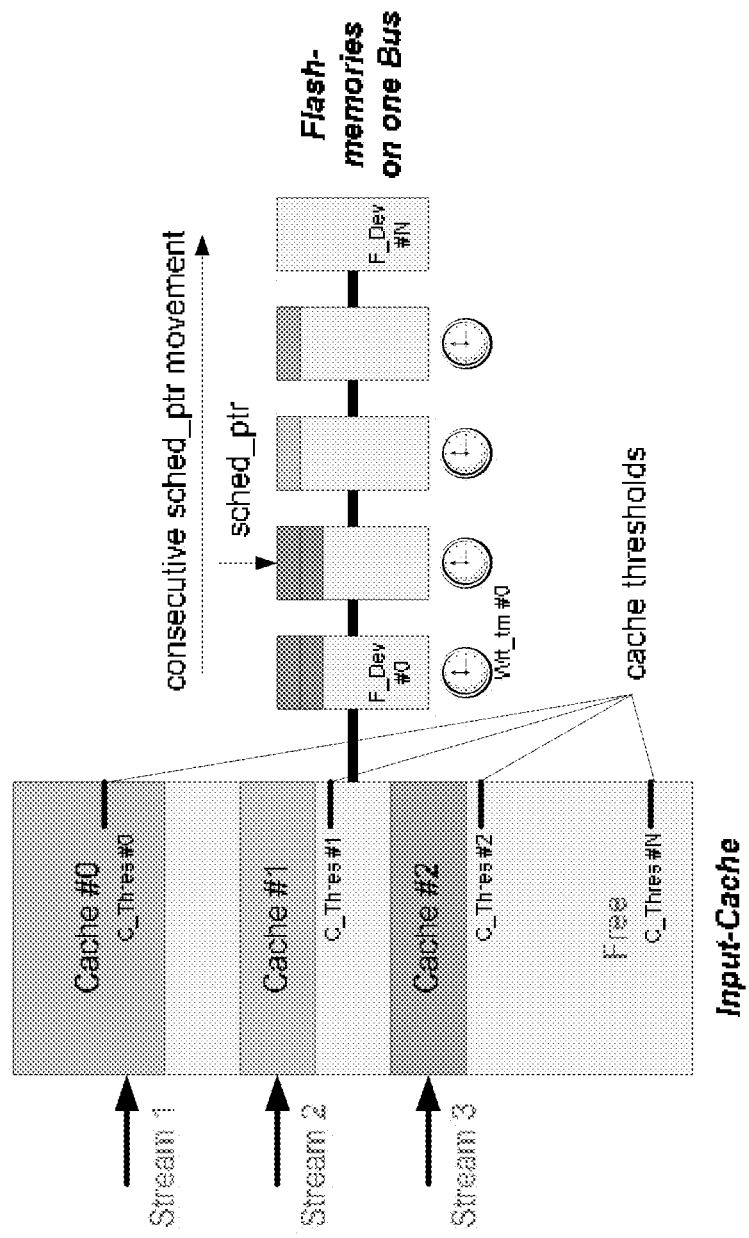
FIG. 1 depicts an exemplary Flash-Die matrix of a multi-stream recording architecture, FIG. 2 exemplarily depicts a flow chart of writing to the exemplary solid state memory device array, FIG. 3 exemplarily depicts play-out using the inventive real-time streaming device.
Figure 2:
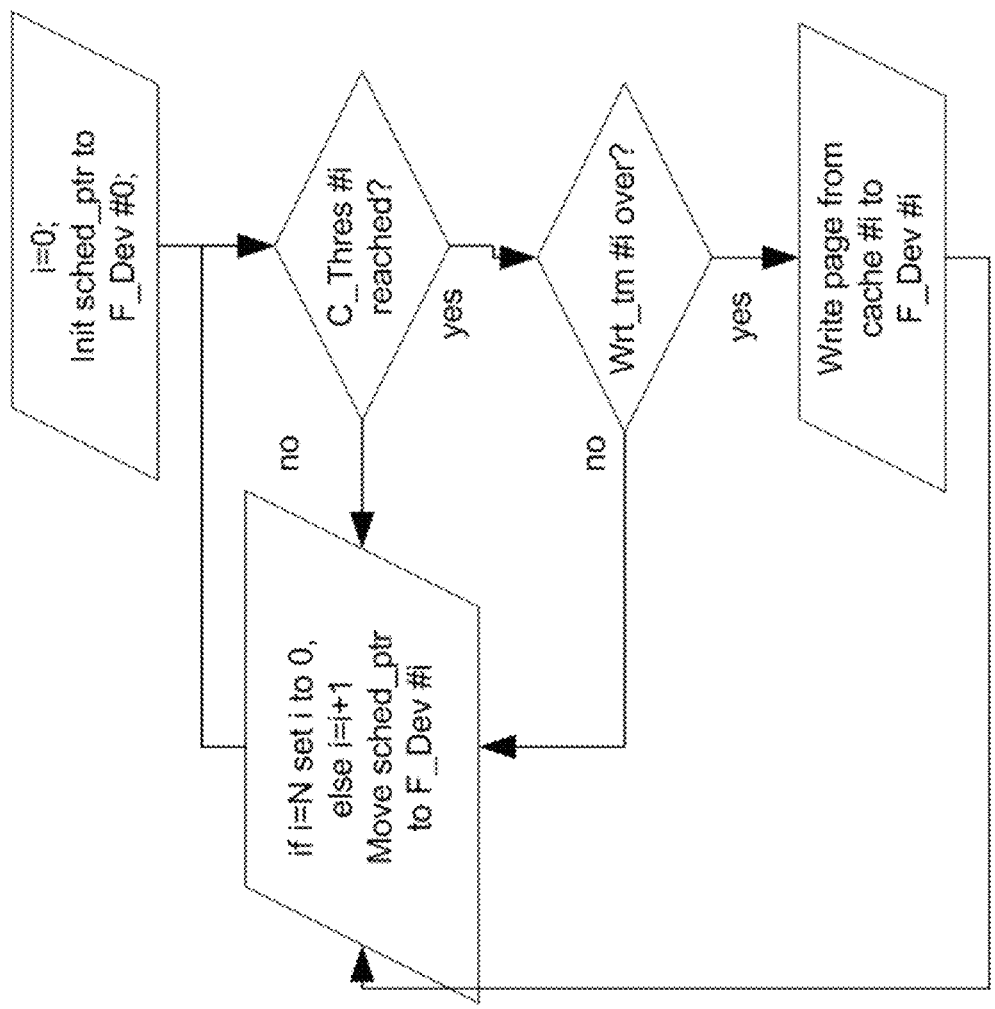
Figure 3:
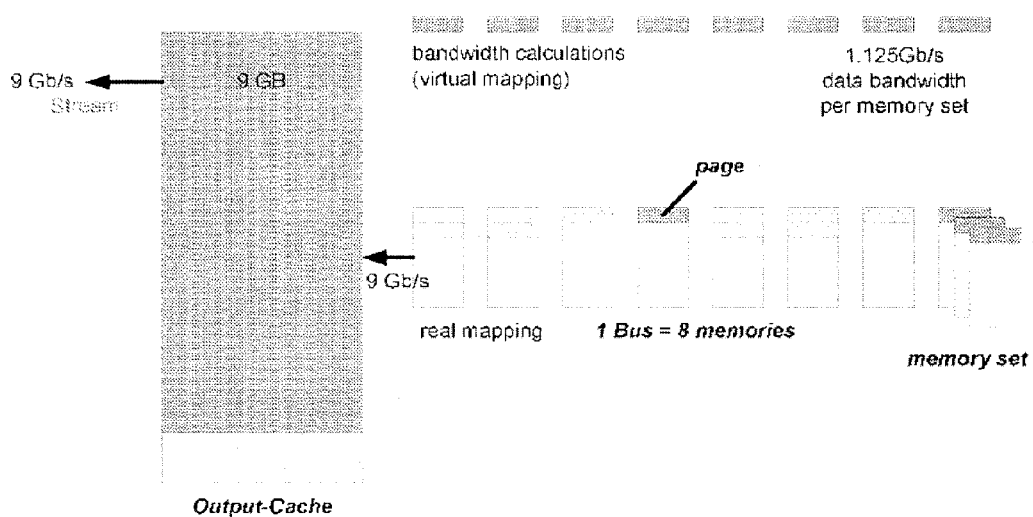

FIG. 2 exemplarily depicts writing to the exemplary solid state memory device array. a pointer (sched_ptr) is consecutively addressing all Flash-Devices on the bus. Starting point is F_Dev #0. When F_Dev #N is reached, it is looped to F_Dev #0 again. For each Flash-Device where sched_ptr is pointing to, it is checked if on the according cache the data threshold is reached (C_Thres). If this is the case, it is also checked if the mentioned Flash-Device has passed the internal write-back time (Wrt_tm) initiated eventually by a preceded data write transfer. If a write-back time is already passed, the amount of data of a Flash page size can be fetched out of the cache into the Flash. If any of the above checked conditions is false, then the pointer is incremented, to address the next Flash-Device on the bus.

Let $D_{max}$ denote the maximum input data rate an exemplary real time streaming device may handle, p denote the data amount comprised in one page and n denote the number of solid state memory devices comprised in one memory device set. Further, let $T_r$ denote time required for burst copying up to n pages to a memory device set and $T_w$ denote the time required for writing the burst-copied n pages into the memory units of the memory device set. Thus, the memory device set has a data rate $D_{set}$ $$D_{Set} = \frac{n*p}{(T_r + T_w)} \text{ and } D_{max} = N*D_{Set} = \frac{N*n*p}{(T_w + T_r)}$$

Then, the following equation for $T_r$, the time required for burst copying up to n pages to a memory device set, holds:

$$T_r \frac{n*p}{D_{max}}$$

since the number of device sets N has to chosen such that $$(N-1)*T_r = T_w$$

Said exemplary real-time streaming device then may handle up to k Streams $S_0 \ldots S_{k-1}$ with data rates $D_0 \ldots D_{k-1}$, as long as the following condition is satisfied:

$$\Sigma_{i=0}^{k-1}(D_i - \mod(D_i, D_{Set})) < D_{max} - k*D_{Set} = (N-k)*D_{Set}$$

Thus, at most k=(N-1) can be handled in parallel.

Suppose $D_i >= D_j$ for i>j. There are allotted individual cache buffering capacities $C_0 \ldots C_k$ for the streams.

Let $$t_i = \frac{p}{D_i}$$

denote the time required to accumulate data amount p from stream $S_i$ in cache buffer. Further, let adjuvant variables $q_{k-1}$ i=0, ..., k and Q be defined as:

$$q_{k-i} = \frac{t_{k-i}}{T_r} - i$$

and $$Q = \max(q_k, q_{k-1}, q_{k-2}, \ldots, q_1, q_0)$$

Burst copying data from the stream with the highest data rate, $S_k$, cannot start earlier than start time $t_k'$:

$$t'_k = t_k - T_r$$

Thus, burst copying of data received from stream $S_{k-1}$ may start no earlier than $t_k$ but may be retarded until $t_{k-1} - T_r$ has elapsed as the data amount of one page is required for burst copying. Thus, burst copying data from the stream $S_{k-1}$, cannot start earlier than start time $t'_{k-1}$:

$$t'_k = \max(t_k, t_{k-1} - T_r) = \max(q_k, q_{k-1}) * T_r$$

And, burst copying data from the stream $S_{k-i}$, cannot start earlier than start time $t'_{k-i}$:

$$t'_{k-i} = \max(q_k, \ldots, q_{k-i}) * T_r + (i-1) * T_r$$

Further, burst copying data from the stream $S_0$, cannot start earlier than start time $t'_0$:

$$t'_0 = Q * T_r + (k-1) * T_r$$

Thus, minimum overall cache buffering capacity $C_{min}$ may be determined as $$C_{min} = \Sigma_{i=0}^{k} t'_i * D_i = T_r * \Sigma_{i=0}^{k} (\max(q_k, \ldots, q_{k-1}) = (i-1)) * D_i$$

Since, by definition, $D_k >= D_i$, and $$\max(q_0, \ldots, q_{k-1}) \le Q \le q_0 + i \le \frac{t_0}{T_r} = \frac{p}{D_0 * T_r},$$

an upper bound of minimum overall cache buffering capacity $C_{min}$ may be determined:

$$C_{min} \le T_r * D_k * \left((k+1) * Q + \frac{k * (k-1)}{2}\right) \le$$

$$p * \left(\frac{T_r}{t_k} * \frac{k * (k-1)}{2} + (k+1) * \frac{t_0}{t_k}\right)$$

Bandwidth allocation of multiple streams may be done in equal portions of the maximum provided bandwidth divided by the amount of Flash memory device sets per bus N over a bus-count n, i.e. the number of parallel busses. Presupposed is that the maximum available bandwidth is totally covered by the interleaving of all exemplary Flash memories on the busses.

When the amount of interleaved exemplary Flash memory device sets per bus is N then the upper bound for the size of one portion can be determined as $$P_{max} \frac{D_{max}}{N} = \frac{n * p}{(T_w + T_r)}$$

According to the proposed architecture, N streams can allocate (N-1) portions. Since one additional bandwidth portion of N can be dynamically consumed by scheduling, in theory the rest of this portion is available for allocation, too, but in practise scheduling algorithms become more simple and regular, when not using parts of this additional portion.

The invention claimed is:

1. Device for real-time streaming to an array of solid state memory device sets, each set comprising n parallel addressable solid state memory devices wherein each solid state memory device comprises one or more solid state memory units each comprising a page buffer configured for buffering a data amount p during a page-receiving-time t_r and each solid state memory unit is configured for writing said data amount p from the page buffer to the solid state memory during a page-writing-time wrt_tm, said device for real-time streaming comprising receiving means for receiving data from at most k data streams in parallel, each data stream being received with an individual data rate and receiving the at most k data streams in parallel results in a data rate of receiving which equals the cumulated individual data rates, an input cache for buffering received data, a bus system of n parallel buses configured for transferring data from the input cache to the solid state memory device sets, and a controller for controlling the bus system such that data received from a first data stream of the data streams received in parallel is transferred to solid state memory device sets comprised in a first subset of said array of solid state memory device sets, only, and data received from at least a second data stream of the data streams received in parallel is transferred to solid state memory device sets comprised in a different second subset of said array of solid state memory device sets, only, wherein the controller is further configured for using the page-receiving-time t_r, the page-writing-time wrt_tm, the data amount p and the individual data rates for dynamically controlling to which one of the solid state memory device sets the bus system is transferring data.

2. The device of claim 1, wherein the bus system is configured for accessing the solid state memory device sets sequentially and the controller is configured for determining, for a currently accessed memory device set, whether page-writing time has elapsed since last transfer of data to the currently accessed memory device set, if so, whether the currently accessed memory device set belongs to the first or the second subset, whether received data accumulated in the input cache from the data stream corresponding to the determined subset amounts to at least one page, if so, the controller causes the bus system to transfer one page of data accumulated in the input cache from the corresponding data stream to the currently accessed memory device set, and otherwise, the controller causes the bus system to access the next solid state memory device set in the sequence.

3. Bus control method for controlling a bus system of a real-time streaming device, said bus system being configured for transferring data from an input cache to an array of solid state memory device sets for streaming two or more data streams to the solid state memory device set array wherein the solid state memory device set are accessed by the bus sequentially, said method comprises determining, for a currently accessed solid state memory device set, whether page-writing time has elapsed since last transfer of data to the accessed memory device set, if so, determining whether the currently accessed memory device set belongs to a first or the second subset of said array of solid state memory device sets wherein said first subset is designated for storing a first data stream and said second subset is designated for storing at least a second data stream, determining whether received data accumulated in the buffer input cache from the data stream to which the determined subset is designated amounts to at least one page, only if so, causing the bus system to transfer at least one page of data accumulated in the input cache from the data stream to which the determined subset is designated to the currently accessed solid state memory device set, and causing the bus system to access the next solid state memory device set.

\* \* \* \* \*

UNITED STATES PATENT AND TRADEMARK OFFICE
CERTIFICATE OF CORRECTION

PATENT NO. : 8,417,846 B2  
APPLICATION NO. : 12/815636  
DATED : April 9, 2013  
INVENTOR(S) : Brune et al.

Page 1 of 1

It is certified that error appears in the above-identified patent and that said Letters Patent is hereby corrected as shown below:

In the Claims:

Column 6 - Claim 3:

Line 63 should read: "input cache from the data stream to which the". Please delete the word "buffer".

Signed and Sealed this
Twenty-first Day of May, 2013

Teresa Stanek Rea
*Acting Director of the United States Patent and Trademark Office*